(12) United States Patent
Ohkubo et al.

(10) Patent No.: US 9,862,378 B2
(45) Date of Patent: Jan. 9, 2018

(54) CONTROL DEVICE FOR HYBRID VEHICLE

(71) Applicant: MITSUBISHI JIDOSHA KOGYO KABUSHIKI KAISHA, Tokyo (JP)

(72) Inventors: Hiroo Ohkubo, Nagoya (JP); Hirokazu Taniuchi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/748,471

(22) Filed: Jun. 24, 2015

(65) Prior Publication Data

US 2015/0375739 A1 Dec. 31, 2015

(30) Foreign Application Priority Data

Jun. 25, 2014 (JP) .................... 2014-130394

(51) Int. Cl.
| | |
|---|---|
| *B60L 9/00* | (2006.01) |
| *B60W 20/50* | (2016.01) |
| *B60W 10/06* | (2006.01) |
| *B60W 10/08* | (2006.01) |
| *B60W 10/02* | (2006.01) |
| *B60W 30/18* | (2012.01) |
| *B60K 6/442* | (2007.10) |

(52) U.S. Cl.
CPC .............. *B60W 20/50* (2013.01); *B60K 6/442* (2013.01); *B60W 10/02* (2013.01); *B60W 10/06* (2013.01); *B60W 10/08* (2013.01); *B60W 30/18036* (2013.01); *Y02T 10/6234* (2013.01); *Y02T 10/6286* (2013.01); *Y02T 10/7258* (2013.01); *Y10S 903/93* (2013.01)

(58) Field of Classification Search
CPC ....... B60K 6/442; B60W 10/02; B60W 10/06; B60W 10/08; B60W 20/40; B60W 20/50; B60W 2600/00; B60W 2710/021; B60W 2710/023; B60W 2710/06; B60W 2710/0605; B60W 2710/08; B60W 30/18036; Y02T 10/623; Y02T 10/6234
USPC ........................................................ 701/22
See application file for complete search history.

(56) References Cited

U.S. PATENT DOCUMENTS

| | | | |
|---|---|---|---|
| 6,209,672 | B1 | 4/2001 | Severinsky |
| 2001/0011050 | A1 | 8/2001 | Yamaguchi et al. |

(Continued)

FOREIGN PATENT DOCUMENTS

| | | |
|---|---|---|
| CN | 102083664 A | 6/2011 |
| CN | 103338993 A | 10/2013 |

(Continued)

*Primary Examiner* — Muhammad Shafi
(74) *Attorney, Agent, or Firm* — Birch, Stewart, Kolasch & Birch, LLP

(57) ABSTRACT

A control device for a hybrid vehicle includes a traction motor that is for driving a vehicle and transmits power to the wheels of the vehicle, an engine that is connected to a power transmission route to the vehicle wheels, through a clutch, a generator that is connected to the engine, a breakdown detecting unit that detects a breakdown of the traction motor, and a retreat traveling control unit that stops firing of the engine and operates the generator as a motor while switching the clutch to a connection state to make the vehicle travel using the generator, in a case where a breakdown of the traction motor is detected by the breakdown detecting unit.

7 Claims, 4 Drawing Sheets

(56) References Cited

U.S. PATENT DOCUMENTS

| | | | |
|---|---|---|---|
| 2005/0061564 A1* | 3/2005 | Kuang | B60W 20/13 180/65.235 |
| 2007/0216312 A1* | 9/2007 | Ogata | B60K 6/48 315/131 |
| 2011/0180337 A1 | 7/2011 | Khatchikian et al. | |
| 2012/0316715 A1* | 12/2012 | Suzuki | B60K 6/48 701/22 |
| 2013/0225239 A1* | 8/2013 | Wu | H04W 88/06 455/558 |
| 2013/0297137 A1 | 11/2013 | Fushiki et al. | |
| 2013/0325239 A1* | 12/2013 | Ozaki | B60T 7/12 701/22 |

FOREIGN PATENT DOCUMENTS

| | | |
|---|---|---|
| EP | 1125781 A1 | 8/2001 |
| EP | 1522450 A2 | 4/2005 |
| EP | 2679433 A1 | 1/2014 |
| JP | 7-67208 A | 3/1995 |
| JP | 11-75302 A | 3/1999 |
| JP | 2005-304229 A | 10/2005 |

\* cited by examiner

CONTROL DEVICE FOR HYBRID VEHICLE

CROSS REFERENCE TO RELATED APPLICATION

This application is based on Japanese Patent Application No. 2014-130394 filed on Jun. 25, 2014, the contents of which are incorporated herein by reference.

BACKGROUND

1. Technical Field

The present invention relates to a control device for making retreat traveling possible in a case where a traction motor installed in a hybrid vehicle is broken.

2. Related Art

In the related art, there has been developed a hybrid vehicle which includes an engine and a traction motor (a motor generator) as driving sources for the vehicle, and can allow or interrupt transmission of the driving power of the engine to a power transmission route by a clutch, wherein a generator is connected to the engine. That is, the hybrid vehicle can separately perform driving power generation and electric power generation by the engine and the motor, respectively. This series-parallel type hybrid vehicle can cope with various vehicle driving modes as compared to existing simple driving types such as a series type or a parallel type, and can use the engine and the motor separately or together depending on its traveling state.

However, in some hybrid vehicles each of which is equipped with a plurality of driving sources, in a case where one driving source is broken, control to use any other driving source to drive a vehicle is performed. For example, there is a known vehicle which travels using an engine instead of a motor when the motor is broken. Also, there is a known vehicle which is equipped with a plurality of motor generators, and uses an unbroken motor generator and an engine together such that the vehicle is driven by the engine while using the motor generator to assist the driving power of the engine and generate regenerative electric power. According to this control, even if the motor is broken, traveling performance of the vehicle is secured, and retreat traveling (auxiliary traveling) for moving the vehicle to a repair plant becomes easy (see JP-A-2005-304229 and JP-A-7-067208).

However, when the motor is broken, if there is no fuel for the engine, it is impossible to perform control to use the engine as a driving source. That is, even though regenerative electric power, electric power generated by the generator, and electric power stored in a battery for traveling are abundant, when the motor is broken, retreat traveling of the vehicle may be impossible. Also, even though there is enough fuel, if the fuel supply system and control system of the engine are coincidentally broken, it is impossible to drive the engine, and thus retreat traveling of the vehicle becomes difficult.

Also, motors have characteristics in which they easily obtain torque in a low rotation speed zone; whereas engines have characteristics in which they easily obtain torque in a high rotation speed zone. Meanwhile, in a case of using an engine to drive a vehicle, since an engine rotation speed zone varies depending on the traveling state or load of the vehicle, there is a problem in which the engine may operate in a low rotation speed zone where operation efficiency is low, resulting in a decrease in energy efficiency relative to traveling of the vehicle.

Also, as engines to be installed in hybrid vehicles, types of engines suitable for operations in a high rotation speed zone as described above are often used. In a case of operating such an engine in a low rotation speed zone, if a transmission for giving an appropriate speed reduction ratio does not exist on a power transmission route from the engine to drive wheels, it may become impossible to keep the rotating state of the engine, resulting in an engine stall. That is, in a case of a hybrid vehicle having no transmission as described above, it is practically difficult to start and drive the vehicle by only an engine.

The present invention was made in view of the above described problems, and an object of the present invention is to provide a control device for a hybrid vehicle capable of improving vehicle traveling performance without depending on an engine when a motor is broken. However, the present invention is not limited to that object, and any other inventions which achieve effects which can be derived from components to be described below but cannot be achieved by technologies according to the related art can be regarded as other objects of the present invention.

SUMMARY (1) According to an aspect of the invention, a control device for a hybrid vehicle includes a traction motor that is for driving a vehicle and transmits power to the wheels of the vehicle, an engine that is connected to a power transmission route to the vehicle wheels, through a clutch, a generator that is connected to the engine, a breakdown detecting unit that detects a breakdown of the traction motor, and a retreat traveling control unit that stops firing of the engine and operates the generator as a motor while switching the clutch to a connection state to make the vehicle travel using the generator, in a case where a breakdown of the traction motor is detected by the breakdown detecting unit.

(2) The control device for a hybrid vehicle of (1) further includes a normal traveling control unit that drives the engine in a firing mode according to the speed of the vehicle while switching the clutch to the connection state to make the vehicle perform parallel traveling using both of the traction motor and the generator. The retreat traveling control unit switches the clutch into the connection state at a connection speed lower than that of the normal traveling control unit.

(3) In the control device for a hybrid vehicle of (1) or (2), the retreat traveling control unit makes the connection speed of the clutch during starting of the vehicle lower than that during traveling of the vehicle.

(4) In the control device for a hybrid vehicle of any one of (1) to (3), the retreat traveling control unit sets the connection speed of the clutch based on the speed of the vehicle.

(5) In the control device for a hybrid vehicle of any one of (1) to (4), between the engine and drive wheels, a fixed gear ratio type deceleration unit is interposed.

(6) In the control device for a hybrid vehicle of any one of (1) to (5), between the engine and the generator, a one-way clutch for interrupting transmission driving power from the generator to the engine is interposed.

(7) In the control device for a hybrid vehicle of any one of (1) to (6), the retreat traveling control unit controls the throttle opening of the engine such that the throttle opening is fully opened.

(8) According to another aspect of the invention, a control device for a hybrid vehicle includes a traction motor that is for driving a vehicle and transmits power to the wheels of the vehicle, an engine that is connected to a power transmission route to the vehicle wheels, through a clutch, a generator that is connected to the engine, a breakdown detecting unit that detects a breakdown of the traction motor, and a retreat traveling control unit that operates the generator as a motor while switching the clutch to a connection state to make the vehicle travel using the generator while making the engine act as a rotation load of the generator, in a case where a breakdown of the traction motor is detected by the breakdown detecting unit.

(9) The control device for a hybrid vehicle of (8) further includes a normal traveling control unit that drives the engine in a firing mode according to the speed of the vehicle while switching the clutch to the connection state to make the vehicle perform parallel traveling using both of the traction motor and the engine. The retreat traveling control unit switches the clutch into the connection state at a connection speed lower than that of the normal traveling control unit.

(10) In the control device for a hybrid vehicle of (8) or (9), the retreat traveling control unit makes the connection speed of the clutch during starting of the vehicle lower than that during traveling of the vehicle.

(11) In the control device for a hybrid vehicle of any one of (8) to (10), the retreat traveling control unit sets the connection speed of the clutch based on the speed of the vehicle.

(12) In the control device for a hybrid vehicle of any one of (8) to (11), between the engine and drive wheels, a fixed gear ratio type deceleration unit is interposed.

(13) In the control device for a hybrid vehicle of any one of (8) to (12), between the engine and the generator, a one-way clutch for interrupting transmission driving power from the generator to the engine is interposed.

(14) In the control device for a hybrid vehicle of any one of (8) to (13), the retreat traveling control unit controls the throttle opening of the engine such that the throttle opening is fully opened.

(15) According to another aspect of the invention, a control device for a hybrid vehicle includes a traction motor that is for driving a vehicle and transmits power to the wheels of the vehicle, an engine that is connected to a power transmission route to the vehicle wheels, through a clutch, a generator that is connected to the engine, a normal traveling control unit that drives the engine in a firing mode according to the speed of the vehicle while switching the clutch to a connection state to make the vehicle perform parallel traveling using both of the traction motor and the engine, and a retreat traveling control unit that operates the generator as a motor while switching the clutch to the connection state to make the vehicle travel using the generator while making the engine act as a rotation load of the generator.

(16) In the control device for a hybrid vehicle of (15), the retreat traveling control unit switches the clutch into the connection state at a connection speed lower than that of the normal traveling control unit.

DESCRIPTION OF PREFERRED EMBODIMENT

With reference to drawings, a control device for a hybrid vehicle according to an embodiment will be described. However, the embodiment to be described below is just illustrative, and is not intended to exclude various modifications or adoption of technologies, not clearly specified in the embodiment. Components of the present embodiment can be variously modified and implemented without departing from the scope thereof, and can be selectively adopted or eliminated or can be appropriately combined, if necessary.

[1. Device Configuration]

Figure 1:
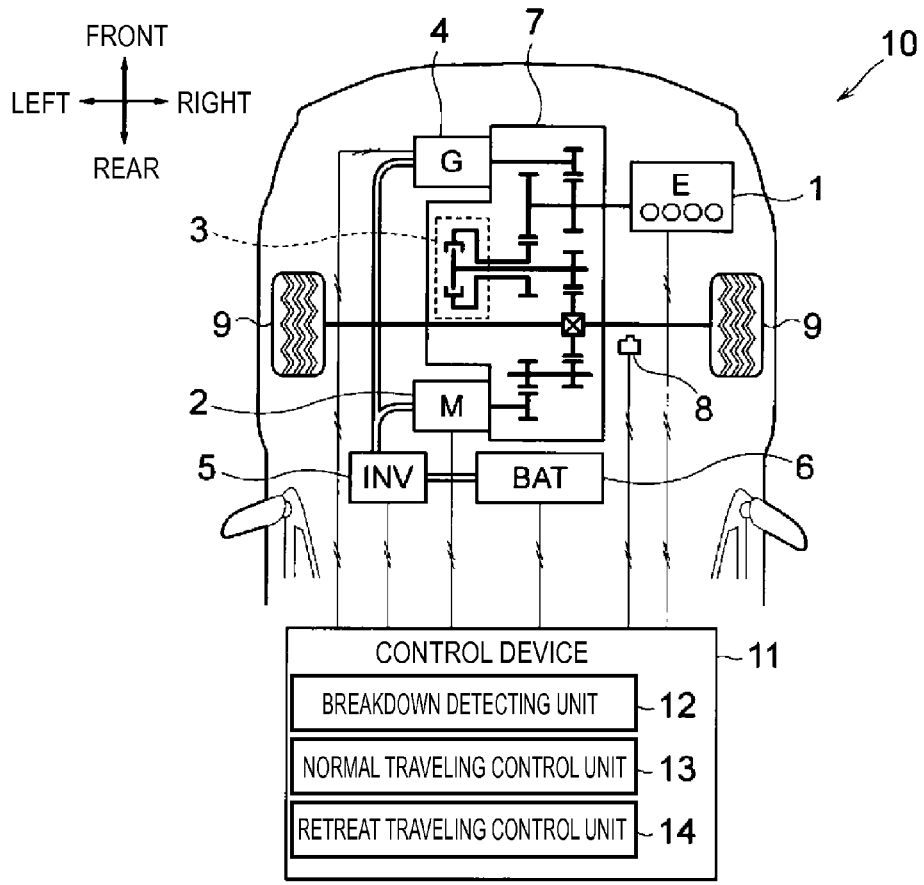
FIG. 1 is a schematic diagram illustrating a configuration of a control device for a hybrid vehicle according to an embodiment.

The structure of a power train of a vehicle 10 using a control device according to the present embodiment is shown in FIG. 1. The vehicle 10 is a series-parallel type FF (front-engine front-drive) hybrid vehicle equipped with an engine 1 and a motor 2 as driving sources. The engine 1 is an internal combustion engine such as a gasoline engine or a diesel engine. Also, the motor 2 is an AC motor generator (a motor generator) having both of a function of acting as an electric motor and a function of acting as an electric generator, and transmits power to drive wheels 9. Meanwhile, the engine 1 is connected to a power transmission route to the drive wheels 9, through a clutch 3. The engine 1 and the motor 2 are connected in parallel to the drive wheels 9 on the power transmission route of the drive wheels 9. Also, around an axle of the drive wheels 9, a vehicle speed sensor 8 for detecting vehicle speed V is provided. Information on the vehicle speed V detected by the vehicle speed sensor 8 is transmitted to a control device 11 to be described below.

Between the engine 1 and the motor 2, and the drive wheels 9, a transaxle 7 is interposed. The transaxle 7 is a power transmission unit including a differential gear (a differential unit) and a final drive (a final deceleration unit), and includes a plurality of mechanisms taking charge of power transmission between the two driving sources and the drive wheels 9. The transaxle 7 of the present embodiment is a fixed gear ratio type deceleration unit which does not include any speed change mechanism.

With respect to power transmission routes which are formed inside the transaxle 7, on a power transmission route between the motor 2 and the drive wheels 9, a gear mechanism for reducing the rotation speed of the motor 2 at a predetermined speed reduction ratio is interposed. Meanwhile, on a power transmission route between the engine 1 and the drive wheels 9, in addition to a gear mechanism for reducing the rotation speed of the engine 1 at a predetermined speed reduction ratio, the clutch 3 is interposed. The connection/disconnection state of the clutch 3 is controlled such that the engine 1 is connected to the power transmission route or is disconnected from the power transmission route. Also, a generator 4 is connected to the power transmission route between the engine 1 and the clutch 3. The generator 4 is an AC motor generator (a motor generator) having both of a function of acting as an electric generator for generating electric power using the driving power of the engine 1 and a function of acting as an electric motor for transmitting the driving power to the drive wheels 9. The output power of the generator 4 may be lower than the output power of the motor 2; however, it is preferable that the generator 4 should have at least such output power (several tens kilowatts or more) that the vehicle 10 can move slowly.

Each of the motor 2 and the generator 4 is connected to a battery 6 for traveling, through an inverter 5. Current which is transferred on the battery (6) side from the inverter 5 is DC current, and current which is transferred on the motor (2) side or the generator (4) side from the inverter 5 is AC current. The inverter 5 performs conversion between DC current and AC current. Also, the rotation speed of each of the motor 2 and the generator 4 is proportional to the AC frequency of supply current. The operation of the inverter 5 is controlled such that an amount of current and voltage to be supplied to the motor 2 or the generator 4, the AC frequency thereof, and so on are controlled, whereby the rotation speed and output torque of the motor 2 or the generator 4 are adjusted.

The control device 11 is an electronic control unit (ECU) for generally managing the operations of various units installed in the vehicle 10, and is connected to a communication line of an on-vehicle network (not shown). The control device 11 includes a central processing unit (CPU), a micro processor such as a micro processing unit (MPU), a read only memory (ROM), a random access memory (RAM), an auxiliary storage unit, an interface unit, and the like. As shown in FIG. 1 the operation state of each of the engine 1, the motor 2, the clutch 3 the generator 4, the inverter 5, and the battery 6 is controlled by the control device 11. Also, instead of providing the single control device 11, a plurality of control devices (for example, an engine ECU, a motor ECU, a battery ECU, and the like) dispersively having the functions of the control device 11 for control targets may be provided.

In the present embodiment, two kinds of control, that is, normal traveling control and retreat traveling control of various control which is performed by the control device 11 will be mainly described. Here, normal traveling control is control to make the vehicle 10 travel using both of the engine 1 and the motor 2 in a state where the motor 2 is unbroken. Meanwhile, retreat traveling control is control to make the vehicle 10 travel using the generator 4 without using the engine 1 and the motor 2 in a state where the motor 2 is broken. Hereinafter, functional components for performing normal traveling control and retreat traveling control will be described in turn.

[2. Control Components]

In the control device 11, as functional elements for performing normal traveling control and retreat traveling control, a breakdown detecting unit 12, a normal traveling control unit 13, and a retreat traveling control unit 14 are provided. Each of these elements may be realized by electronic circuits (hardware), or may be programmed as software which is recorded and held in the ROM or the auxiliary storage unit. Alternatively, some of the functions of those elements may be provided as hardware, and the others may be provided as software.

[2-1. Breakdown Detecting Unit]

The breakdown detecting unit 12 is for detecting a breakdown of the motor 2 or the generator 4. Here, the breakdown detecting unit 12 detects or determines existence or non-existence of any one of motor breakdowns that the motor 2 does not work, generator breakdowns that the generator 4 does not work, or control breakdowns that any one of control circuits for controlling the motor 2 and the generator 4 does not normally function, and transmits the detection result to the normal traveling control unit 13 and the retreat traveling control unit 14. Also, in a case where the breakdown detecting unit 12 is installed in a control device and the normal traveling control unit 13 and the retreat traveling control unit 14 are installed in another control device, the breakdown detecting unit 12 may be configured as a control component for generating a diagnostic signal according to the kind of a breakdown and transmitting the diagnostic signal to the communication line on the on-vehicle network. Then, the normal traveling control unit 13 and the retreat traveling control unit 14 can acquire the diagnostic signal through the communication line.

Here, motor breakdowns include a breakdown that the motor does not rotate due to adhesion of the rotor of the motor 2 to the stator, a breakdown of the bearing of the rotator, and so on. As a motor breakdown determining method, a known method can be applied. For example, in a case where the motor 2 does not work even though the control circuit is normal, occurrence of a motor breakdown can be determined. In motor breakdown determination, it is possible to use information on current and voltage which are supplied from the inverter 5 to the motor 2 and the AC frequency thereof, information on current and voltage which are input to the motor 2 and the AC frequency thereof, information on the rotation speed and temperature of the motor 2, and the like. This is common to generator breakdowns.

Also, here, control breakdowns include abnormalities of the control circuits (such as a sky abnormality, an earth abnormality, and a voltage abnormality), control line abnormalities (a disconnection and a short circuit), and the like. Even with respect to a control breakdown determining method, a known method can be applied. For example, in a case where a control signal which is output from the control device 11 exceeds a normal range, or in a case where a control signal received by the motor 2 or the generator 4 is different from a control signal output by the control device 11, occurrence of a control breakdown can be determined. In control device determination, it is possible to use information on current and voltage at each portion on the control circuits, information on current and voltage of a control signal which is input to the inverter 5, information on the temperature of the inverter 5, and the like.

[2-2. Normal Traveling Control Unit]

The normal traveling control unit 13 is for controlling the traveling state of the vehicle 10 (that is, normal traveling) in a case where a breakdown of the motor 2 is not detected by the breakdown detecting unit 12. The normal traveling control unit 13 selects one traveling mode from a plurality of traveling modes according to the traveling state of the vehicle 10, the charged state of the battery 6, the state of a traveling load, and the like, and controls the operation states of various units of the power train on the basis of the selected traveling mode. The normal traveling control unit 13 has at least a function of driving the engine 1 according to the vehicle speed V while switching the clutch 3 to a connection state, and making the vehicle 10 travel using both of the engine 1 and the motor 2. In the present embodiment, a case where three modes of an EV traveling mode, a series traveling mode, and a parallel traveling mode are set as the plurality of traveling modes is exemplified.

The EV traveling mode is a traveling mode for using the charged power of the battery 6 to make the vehicle 10 travel by only the driving power of the motor 2. A condition for selection of the EV traveling mode is, for example, a condition that the charged power of the battery 6 should be equal to or greater than predetermined power, and the vehicle speed V should be lower than predetermined vehicle speed $V_0$. If the EV traveling mode is selected, the engine 1 and the generator 4 become a non-operation state, and the clutch 3 is switched to a disconnection state.

The series traveling mode is a traveling mode for making the vehicle 10 travel by the driving power of the motor 2 while operating the engine 1 and generating electric power by the generator 4. A condition for selection of the series traveling mode is, for example, a condition that the charged power of the battery 6 should be less than the predetermined power, and the vehicle speed V should be lower than the predetermined vehicle speed $V_0$. If the series traveling mode is selected, the engine 1 and the generator 4 operate, and the clutch 3 is switched to the disconnection state.

The parallel traveling mode is a traveling mode for making the vehicle 10 travel mainly using the driving power of the engine 1 while secondarily using the driving power of the motor 2 during high-speed traveling when it is possible to take out energy from the engine 1 with high efficiency. In the parallel traveling mode, the engine 1 is driven in a firing mode according to the vehicle speed V A condition for selection of the parallel traveling mode is, for example, a condition that the vehicle speed V should be equal to or higher than the predetermined vehicle speed $V_0$, a condition that a driver should perform a sudden acceleration operation, a condition that the load of an air conditioner should increase, or the like. If any one of these conditions is satisfied, the parallel traveling mode is selected.

Also, in the parallel traveling mode, clutch connection speed CV is set according to the vehicle speed V at that moment. For example, the normal traveling control unit 13 controls the clutch 3 such that the clutch connection speed CV increases as the vehicle speed V increases. The relation between the vehicle speed V and the clutch connection speed CV during normal traveling is shown by a solid line in FIG. 2. The parallel traveling mode is selected mainly when the vehicle speed V is equal to or higher than the predetermined vehicle speed $V_0$, and the clutch connection speed CV is generally set to be equal to or higher than the predetermined connection speed $CV_0$. Meanwhile, in some conditions for traveling mode selection, there is a case where the parallel traveling mode is selected when the vehicle speed V is lower than the predetermined vehicle speed $V_0$. In this case, the clutch connection speed CV is set to be lower than the predetermined connection speed $CV_0$ and is set within a range equal to or higher than at least predetermined connection speed $CV_1$ (wherein $CV_1 < CV_0$.

[2-3. Retreat Traveling Control Unit]

The retreat traveling control unit 14 is for operating the generator 4 as an electric motor, thereby controlling the traveling state of the vehicle 10 (that is, retreat traveling), without using the engine 1 and the motor 2, in a case where a breakdown of the motor 2 is detected by the breakdown detecting unit 12. The operation states of the engine 1, the motor 2, the clutch 3, and the generator 4 at the start time of retreat traveling vary depending on the kind of the selected traveling mode at that time. Therefore, the retreat traveling control unit 14 of the present embodiment performs different kinds of control according to the kinds of the traveling modes.

In a case of starting retreat traveling in the EV traveling mode, the engine 1 and the motor 2 are in the non-operation state, and the clutch 3 is in the disconnection state. The retreat traveling control unit 14 operates the generator 4 as an electric motor while keeping the engine 1 in the non-operation state, and switches the clutch 3 to the connection state. In this case, firing of the engine 1 (fuel supply and combustion) is stopped, and the crankshaft of the engine 1 is rotated in conjunction with the generator 4 (an idle state). Also, the clutch connection speed CV is set according to the vehicle speed V so as to be lower than the clutch connection speed CV which is set during normal traveling. The relation between the vehicle speed V and the clutch connection speed CV during retreat traveling is shown by a thick broken line and a thin broken line in FIG. 2.

Figure 2:
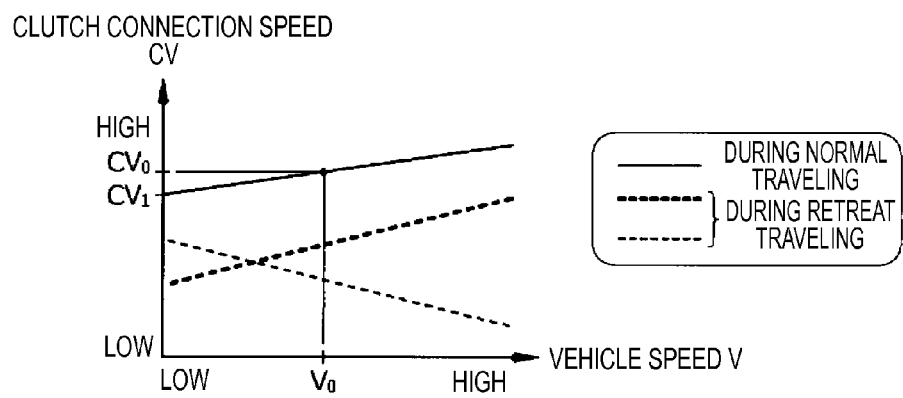
FIG. 2 is a graph illustrating the relation between the connection speed of a clutch and the speed of the vehicle.

In FIG. 2, the thick broken line is a graph giving a characteristic in which the clutch connection speed CV increases as the vehicle speed V increases, and the thin broken line is a graph giving a characteristic in which the clutch connection speed CV decreases as the vehicle speed V increases. During retreat traveling, the clutch connection speed CV is set within a range below at least the solid line of FIG. 2. In the present embodiment, it is assumed that the clutch connection speed CV is set as shown by the thick broken line of FIG. 2. That is, a characteristic in which the clutch connection speed CV increases as the vehicle speed V increases is given. Therefore, the clutch connection speed CV during starting of the vehicle 10 is lower than that during traveling of the vehicle.

In a case of starting retreat traveling in the series traveling mode, the engine 1 and the generator 4 are in operation, and the clutch 3 is in the disconnection state. The retreat traveling control unit 14 stops the operation of the engine 1, and operates the generator 4 as an electric motor, and switches the clutch 3 to the connection state. Similarly to retreat traveling in the EV traveling mode, the crankshaft of the engine 1 is rotated in conjunction with the generator 4, and firing of the engine 1 (fuel supply and combustion) is stopped. Also, the clutch connection speed CV is set according to the vehicle speed V on the basis of the characteristic which is given by the thick broken line of FIG. 2. Also, the clutch connection speed CV may be set using a characteristic different from that during the EV traveling mode.

In a case of starting retreat traveling in the parallel traveling mode, the engine 1 is in operation, and the clutch 3 is in the connection state. The retreat traveling control unit 14 stops the operation of the engine 1 and operates the generator 4 as an electric motor while keeping the connection state of the clutch 3. Similarly to the other traveling modes, the crankshaft of the engine 1 is rotated in conjunction with the generator 4, and firing of the engine 1 (fuel supply and combustion) is stopped. In this case, since the clutch 3 is already in the connection state, it is unnecessary to set the clutch connection speed CV, and the connection state of the clutch 3 is kept as it is.

[3. Flow Charts]

Figure 3:
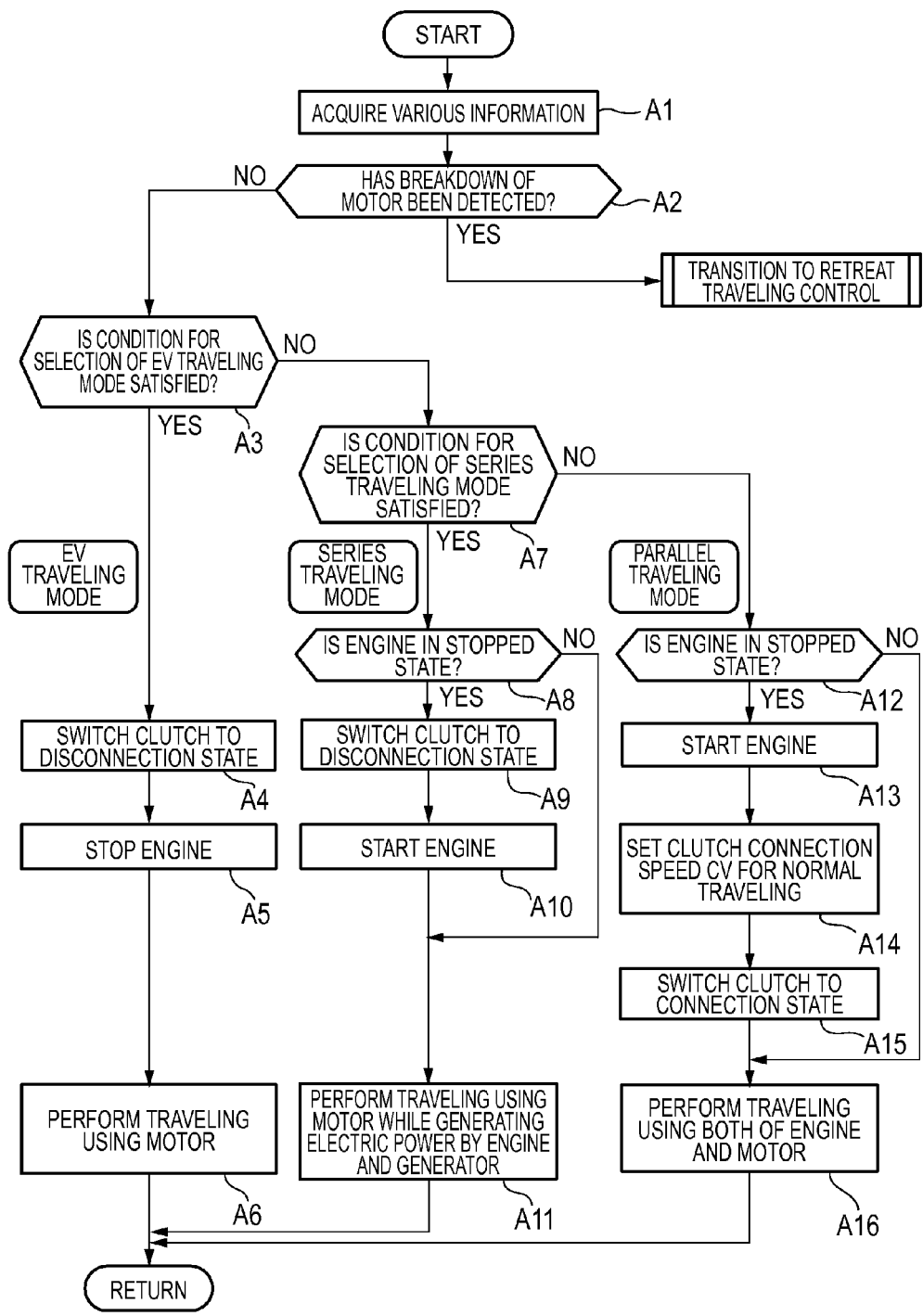
FIG. 3 is a flow chart illustrating the procedure of normal traveling control of the control device.
Figure 4:
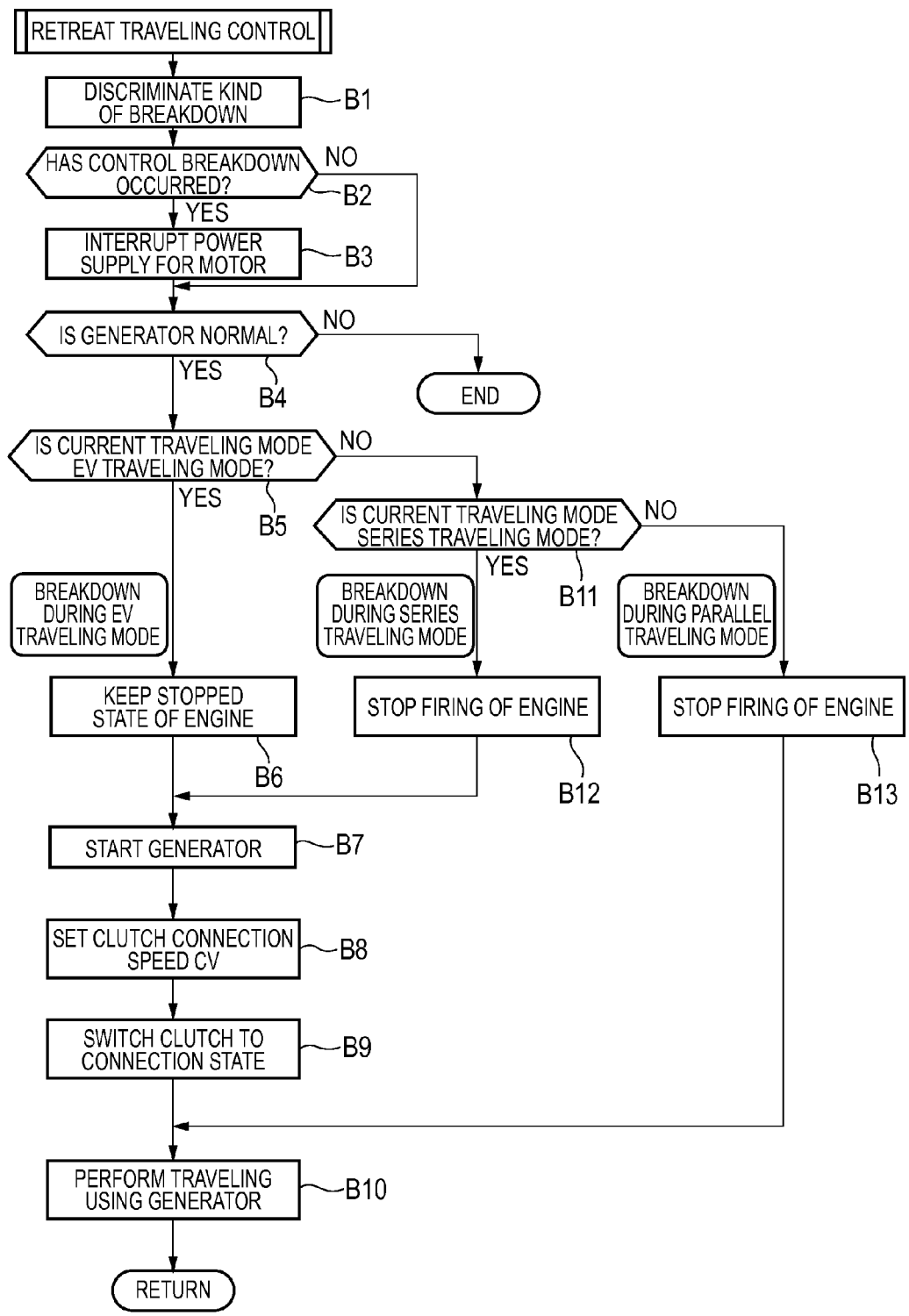
FIG. 4 is a flow chart illustrating the procedure of retreat traveling control of the control device.

FIG. 3 is a main flow chart illustrating a control procedure mainly corresponding to normal traveling control, and FIG. 4 is a sub flow chart illustrating mainly corresponding to retreat traveling control. The main flow chart of FIG. 3 is repeatedly performed at a predetermined cycle in the control device 11. Also, the sub flow chart of FIG. 4 is performed in a case where a breakdown of the motor 2 is detected.

[3-1. Normal Traveling Control]

In step A1 of FIG. 3, various information for setting of a traveling mode or breakdown determination on the motor 2 is input to the control device 11. For example, information on the vehicle speed V acquired by the vehicle speed sensor 8, information on the charged power of the battery 6, information on the operation states of the motor 2, the generator 4, and the inverter 5, information on the load of the vehicle 10, and the like are input to the control device 11. Subsequently, in step A2, it is determined whether a breakdown of the motor 2 has been detected by the breakdown detecting unit 12. Here, in a case where a breakdown of the motor 2 has been detected, control transitions to the retreat traveling control flow shown in FIG. 4. Meanwhile, in a case where a breakdown has not been detected, the procedure proceeds to step A3, and normal traveling control is performed.

In step A3, the normal traveling control unit 13 determines whether the condition for selection of the EV traveling mode is satisfied. For example, in a case where the charged power is equal to or greater than the predetermined power and the vehicle speed V is lower than the predetermined vehicle speed $V_0$, the condition of step A3 is satisfied, and the procedure proceeds to step A4. Meanwhile, in a case where the condition of step A3 is not satisfied, the procedure proceeds to step A7. Steps A4 to A6 are related to power train control in the EV traveling mode.

In step A4, the clutch 3 is switched to the disconnection state. In a case where the clutch 3 is already in the disconnection state, the disconnection state of the clutch 3 is kept. Subsequently, in step A5, control to stop firing of the engine 1 is performed. In a case where firing of the engine 1 is already in a stopped state, the stopped state is kept. As a result, in step A6, EV traveling using only the motor 2 is realized.

In a case where the condition of step A3 is not satisfied, in step A7, the normal traveling control unit 13 determines whether the condition for selection of the series traveling mode is satisfied. For example, in a case where the charged power of the battery 6 is less than the predetermined power, and the vehicle speed V is lower than the predetermined vehicle speed $V_0$, the condition of step A7 is satisfied, and the procedure proceeds to step A8. Steps A8 to A11 are related to power train control in the series traveling mode.

In step A8, it is determined whether the engine 1 is in the stopped state. If the engine 1 is in the stopped state, the procedure proceeds to step A9 in which the clutch 3 is switched to the disconnection state. In a case where the clutch 3 is already in the disconnection state, the disconnection state of the clutch 3 is kept. Subsequently, in step A10, firing and cranking of the engine 1 are performed, whereby the engine 1 is started. Therefore, in step A11, series traveling is realized such that the vehicle 10 is driven by the driving power of the motor 2 while the generator 4 is operated by the driving power of the engine 1 so as to generate electric power. Also, in a case where the engine 1 is already in the operation state in step A8, steps A9 and A10 are skipped, and step A11 is performed.

In a case where the condition of step A7 is not satisfied, the procedure proceeds to step A12. For example, in a case where the charged power of the battery 6 is equal to or greater than the predetermined power, or in a case where the vehicle speed V is equal to or higher than the predetermined vehicle speed $V_0$, or in a case where the driver has performed a sudden acceleration operation, the procedure proceeds to step A12. Steps A12 to A16 are related to power train control in the parallel traveling mode.

In step A12, it is determined whether the engine 1 is in the stopped state. If the engine 1 is in the stopped state, the procedure proceeds to step A13 in which firing and cranking of the engine 1 are performed, whereby the engine 1 is started. Next, in step A14, the clutch connection speed CV for normal traveling is set according to the vehicle speed V with reference to the characteristic as shown by the solid line in FIG. 2. Then, in step A15, the clutch 3 is switched to the connection state at the clutch connection speed CV set in the previous step. Therefore, in step A16, parallel traveling using both of the engine 1 and the motor 2 is realized. Also, in a case where the engine 1 is already in the operation state in step A12, steps A13 to A15 are skipped, and step A16 is performed.

[3-2. Retreat Traveling Control]

The above described normal traveling control is control in a case where a breakdown of the motor 2 is not detected. In contrast to this, the following retreat traveling control is control in a case where a breakdown of the motor 2 is detected. In step B1 of FIG. 4, the breakdown detecting unit 12 discriminates the kind of the breakdown of the motor 2. Subsequently, in step B2, it is determined whether a control breakdown of the motor 2 has occurred. For example, in a case where short-circuiting or disconnection of a control line has occurred, the procedure proceeds to step B3 in which a power supply for the motor 2 is shut off. Meanwhile, in a case where a control breakdown has not occurred, since it is determined that a motor breakdown has occurred, step B3 is skipped, and the procedure proceeds to step B4.

In step B4, it is determined whether a generator breakdown has occurred. In a case where the generator 4 is broken, since it is determined that it is impossible to drive the vehicle 10, the control finishes. Meanwhile, in a case where the generator 4 is not broken, the procedure proceeds to step B5, and retreat traveling control using the driving power of the generator 4 is performed.

In step B5, the retreat traveling control unit 14 determines whether the traveling mode at that moment is the EV traveling mode. Here, in a case where the traveling mode is the EV traveling mode, since the engine 1 is in the stopped state, the procedure proceeds to step B6 in which the stopped state of the engine 1 is kept. Then, in step B7, the generator 4 is driven as an electric motor, that is, the generator 4 is started.

Subsequently, in step B8, the clutch connection speed CV for retreat traveling is set according to the vehicle speed V with reference to the characteristic as shown by the thick broken line in FIG. 2. Then, in step B9, the clutch 3 is switched to the connection state at the clutch connection speed CV set in the previous step. Therefore, the clutch 3 is switched to the connection state at a speed lower than that during normal traveling, and thus the driving power of the generator 4 is slowly transmitted to the drive wheels 9. That is, with respect to the actual output power of the generator 4, the driving power of the vehicle 10 is suppressed until the clutch 3 is completely switched to the connection state, and the suppression time is extended as compared to that during normal traveling. Therefore, in step B10, retreat traveling control using the driving power of the generator 4 is realized.

In a case where the traveling mode is not the EV traveling mode in step B5, the control proceeds to step B11. In step B11, the retreat traveling control unit 14 determines whether the traveling mode at that moment is the series traveling mode. In a case where the traveling mode is the series traveling mode, since the engine 1 is already in the operation state and the clutch 3 is in the disconnection state, the procedure proceeds to step B12 in which control to stop firing of the engine 1 is performed. Thereafter, the procedure proceeds to step B7 in which the generator 4 is driven as an electric motor. The clutch connection speed CV may be set in the same way as that during the EV traveling mode, or may be set in a way different from that during the EV traveling mode. In step B10, the clutch 3 is switched at a speed lower than at least that during normal traveling, and retreat traveling control using the driving power of the generator 4 is realized.

In a case where the traveling mode is not the series traveling mode in step B11, the traveling mode at that moment is the parallel traveling mode. In the case where the traveling mode is the parallel traveling mode, since the engine 1 is already in the operation state and the clutch 3 is in the connection state, the procedure proceeds to step B13 in which control to stop firing of the engine 1 is performed. In this case, the connection state of the clutch 3 is kept. Therefore, in step B10, retreat traveling control using the driving power of the generator 4 is realized.

[4. Actions and Effects]

(1) In the above described control, in a case where a breakdown of the motor 2 is detected, firing of the engine 1 is stopped and the generator 4 is operated while the clutch 3 is switched to the connection state, whereby retreat traveling control to drive the vehicle 10 using the generator 4 is performed. The retreat traveling control unit 14 of the control device 11 acts to drive the vehicle 10 using only the driving power of the generator 4 without using the driving power of the engine 1 during a breakdown of the motor 2.

Due to this control, when the motor 2 is broken, even if fuel for the engine 1 is not sufficient, it is possible to drive the vehicle 10. Therefore, it is possible to make the vehicle 10 to self-travel, for example, to a repair plant, and it is possible to improve the maintainability of the vehicle 10. Also, since the engine 1 acts as the rotation load of the generator 4, it is possible to forcibly reduce the driving power of the vehicle 10 with respect to the actual output power of the generator 4, and it is possible to effectively make an occupant aware of a breakdown of the motor 2. For example, even in a case where the motor 2 is broken while the vehicle 10 is traveling, it is possible to make an occupant aware that the vehicle 10 is not normally traveling, and it is possible to urge the occupant to quickly repair the vehicle 10.

(2) In the above described control, as shown in FIG. 2, during retreat traveling (the thick broken line and thin broken line), the clutch connection speed CV is set to be lower than that during normal traveling (the solid line). Like this, since the connection speed of the clutch 3 during a breakdown of the motor is decreased, it is possible to make it difficult to accelerate the vehicle 10, and it is possible to effectively make an occupant aware of the breakdown of the motor 2.

Also, in a case where a motor breakdown occurs while the vehicle 10 is traveling, if the clutch 3 in the disconnection state is suddenly switched to the connection state, a torque shock may occur. Meanwhile, by slowly switching the clutch 3 to the connection state like the above described control, it is possible to suppress torque shocks.

(3) In the above described control, as shown by the thick broken line in FIG. 2, the characteristic in which the clutch connection speed CV increases as the vehicle speed V increases is given, and thus the clutch connection speed CV during starting of the vehicle 10 is lower than that during traveling of the vehicle.

According to this setting, in a case where the motor 2 is broken when the vehicle 10 is in the stopped state, it is possible to prolong the suppression time of the driving power during starting, and it is possible to effectively make an occupant aware of the breakdown of the motor 2. Meanwhile, in a case where the motor 2 is broken when the vehicle 10 is traveling, since the clutch 3 is switched to the connection state at a speed slightly higher than that during starting, it is possible to moderately keep the traveling state of the vehicle 10 while making an occupant aware of the breakdown of the motor 2.

(4) As shown by the thick broken line and the thin broken line in FIG. 2, since the clutch connection speed CV during a motor breakdown is set according to the vehicle speed V, it is possible to avoid a situation where the vehicle 10 suddenly decelerates during traveling while reducing the driving power of the vehicle 10, thereby making an occupant aware of the breakdown of the motor 2.

(5) Also, since the transaxle 7 installed in the above described vehicle 10 is a fixed gear ratio type deceleration unit which does not include any speed change mechanism, in the retreat traveling control, while firing of the engine 1 is in the stopped state, the rotation load of the engine 1 on the generator 4 becomes substantially constant. Therefore, it is possible to improve controllability of the generator 4.

[5. Modifications]

Figure 5:
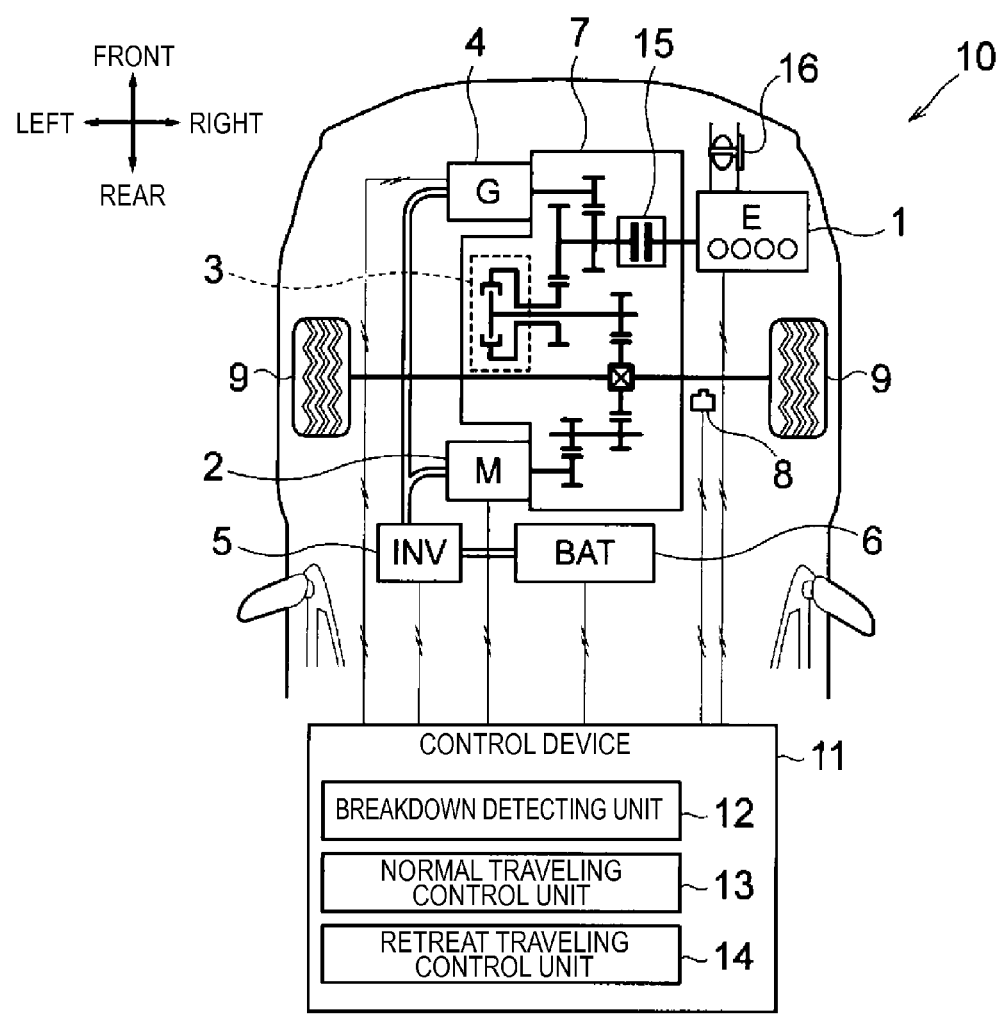
FIG. 5 is a schematic diagram illustrating a configuration of a control device for a hybrid vehicle according to a modification.

In spite of the above described embodiment, the present invention can be variously modified and implemented without departing from the scope of the present invention. For example, as shown in FIG. 5, a one-way clutch 15 may be provided on a power transmission route connecting the generator 4 and the engine 1. The one-way clutch 15 acts to allow transmission of driving power from the engine 1 to the generator 4 and interrupt transmission of driving power from the engine 1 to the generator 4. Therefore, it is possible to solve corotating of the engine 1 according to the operation of the generator 4, and it is possible reduce a loss of the driving power of the generator 4. Also, instead of the one-way clutch 15, a driving power transmitting/interrupting mechanism like the clutch 3 may be provided.

Also, in order to reduce a load according to corotating of the engine 1, the opening (throttle opening) of a throttle valve 16 of the engine 1 may be controlled such that the opening is fully opened. As a result, the circulation resistance of air circulating in the intake passage of the engine 1 decreases, and a pumping loss of the engine 1 (an energy loss according to rotation of the crankshaft) decreases. Therefore, it is possible to reduce a loss of the driving power of the generator 4.

Also, although particularly mentioned in the above described embodiment, specific control for notifying an occupant of a breakdown of the motor 2 may be arbitrarily added. For example, in a case where a breakdown of the motor 2 is detected in step A2 of the flow chart of FIG. 3, in order to notify the breakdown, a lamp may be turned on or a notification sound or a notification message may be sounded from a speaker.

Also, it is preferable to set the output power of the generator 4 during retreat traveling control to be lower than the output power of the motor 2 during normal traveling control. That is, when an amount of depression of an accelerator pedal is constant, in the retreat traveling control, the driving power of the vehicle 10 is set to be lower than that in the normal traveling control. Therefore, it is possible to effectively make an occupant aware of a breakdown of the motor 2.

Also, in the embodiment, control on a series-parallel type FF hybrid vehicle has been described. However, the types of vehicles to which the control of the embodiment can be applied are not limited thereto. It is possible to apply the above described control to at least hybrid vehicles each of which includes a motor 2 for driving the vehicle, an engine 1 connected to the transmission route of the power of the motor 2 through a clutch 3, and a generator 4 connected to the engine 1. In this case, the same effects as those of the above described embodiment are achieved.

Also, in the embodiment, the clutch connection speed CV during retreat traveling is given as shown by the thick broken line in FIG. 2. Since the clutch connection speed CV during retreat traveling needs only to be set within a range below the solid line in FIG. 2, the clutch connection speed CV during retreat traveling may be set as shown by the thin broken line in FIG. 2.

According to an aspect of the present invention, in a case where the motor is broken, it is possible to drive the vehicle by the generator such that the vehicle performs retreat traveling, and it is possible to make the vehicle to self-travel to a repair plant. In this case, since firing of the engine stops, even if there is no fuel, it is possible to make the vehicle travel. Therefore, without depending on the engine, it is possible to improve traveling performance of the vehicle during a motor breakdown.

What is claimed is:

1. A control device for a hybrid vehicle comprising:
   a traction motor that is for driving a vehicle and transmits power to the wheels of the vehicle;
   an engine;
   a power transmission connected to the vehicle wheels;
   a generator that is connected to the engine;
   a clutch that connects the engine and the generator to the vehicle wheels when in a connection state and disconnects the engine and the generator from the vehicle wheels when in a disconnection state;
   a breakdown detecting unit configured to detect a breakdown of the traction motor; and
   a retreat traveling control unit configured to stop firing of the engine and operate the generator as a motor while switching the clutch to the connection state to make the vehicle travel using only the generator, in a case where a breakdown of the traction motor is detected by the breakdown detecting unit, wherein
   upon detecting the breakdown of the traction motor by the breakdown detecting unit, the retreat traveling control unit makes the vehicle travel using the generator without using the engine and the traction motor while the generator rotates the engine.

2. The control device for a hybrid vehicle according to claim 1, further comprising:
   a normal traveling control unit configured to drive the engine in a firing mode according to the speed of the vehicle while switching the clutch to the connection state to make the vehicle perform parallel traveling using both of the motor and the generator,
   wherein the retreat traveling control unit switches the clutch into the connection state at a connection speed lower than that of the normal traveling control unit.

3. The control device for a hybrid vehicle according to claim 1, wherein:
   the retreat traveling control unit makes the connection speed of the clutch during starting of the vehicle lower than that during traveling of the vehicle.

4. The control device for a hybrid vehicle according to claim 1, wherein:
   the retreat traveling control unit sets the connection speed of the clutch based on the speed of the vehicle.

5. The control device for a hybrid vehicle according to claim 1, wherein:
   between the engine and drive wheels, a fixed gear ratio type deceleration unit is interposed.

6. The control device for a hybrid vehicle according to claim 1, wherein:
   the retreat traveling control unit controls the throttle opening of the engine such that the throttle opening is fully opened.

7. A control device for a hybrid vehicle, the hybrid vehicle including a traction motor that is for driving a vehicle and transmits power to vehicle wheels, an engine, a power transmission connected to the vehicle wheels, a generator that is connected to the engine, and a clutch that connects the engine and the generator to the vehicle wheels in a connection state and disconnects the engine and the generator from the vehicle wheels when in a disconnection state, the control device comprising:
   a breakdown detecting unit configured to detect a breakdown of the traction motor; and
   a retreat traveling control unit configured to stop firing of the engine and operate the generator as a motor while switching the clutch to the connection state to make the vehicle travel using only the generator, in a case where a breakdown of the traction motor is detected by the breakdown detecting unit, wherein
   upon detecting the breakdown of the traction motor by the breakdown detecting unit, the retreat traveling control unit makes the vehicle travel using the generator without using the engine and the traction motor while the generator rotates the engine.

* * * * *